(12) United States Patent
Vanderhoof et al.

(10) Patent No.: US 6,208,797 B1
(45) Date of Patent: Mar. 27, 2001

(54) OPTICAL FIBER ROUTING DEVICE AND METHOD OF ASSEMBLY THEREFOR

(75) Inventors: Michael David Vanderhoof, Dallas, TX (US); Marc DeFrancesco, Sebastapol, CA (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/182,473

(22) Filed: Oct. 30, 1998

(51) Int. Cl.[7] .................................................. G02B 6/08
(52) U.S. Cl. ........................ 385/135; 385/134; 385/135
(58) Field of Search ...................................... 385/134, 135

(56) References Cited

U.S. PATENT DOCUMENTS

| | | | |
|---|---|---|---|
| 4,765,708 | 8/1988 | Becker et al. | 350/96.2 |
| 4,861,134 | 8/1989 | Alameel et al. | 350/96.2 |
| 5,142,661 | 8/1992 | Grant et al. | 385/135 |
| 5,237,640 | 8/1993 | Pedraza et al. | 385/136 |
| 5,311,612 | 5/1994 | Vincent et al. | 385/135 |
| 5,329,067 | 7/1994 | Abe et al. | 174/260 |
| 5,442,726 | 8/1995 | Howard et al. | 385/135 |
| 5,469,526 | * 11/1995 | Rawlings | 385/135 |
| 5,659,641 | 8/1997 | DeMeritt et al. | 385/14 |
| 5,689,606 | 11/1997 | Hassan | 385/315 |
| 5,987,207 | * 11/1999 | Hoke | 385/135 |

OTHER PUBLICATIONS

Richco, "Optical Fiber Support Base (OFSB)", catalog excerpt (19 ).

* cited by examiner

Primary Examiner—Hemang Sanghavi
Assistant Examiner—Jennifer Doan
(74) Attorney, Agent, or Firm—Staas & Halsey LLP

(57) ABSTRACT

An optical fiber connection unit has a circuit board with a hole formed therein, oval shaped inner and outer channels separated by an oval shaped separating wall, extension supports and a standoff. The oval shaped inner channel has a radius at least as large as a minimum bend radius of a polymeric optical fiber. The oval shaped outer channel follows the inner channel, but has a larger radius than the inner channel. The oval shaped separating wall has a plurality of openings formed therein where passage between the inner and outer channels is possible. The extension supports extend between the opposing sides of the inner channel. The extension supports meet at an intersection thereof, and a connection hole is formed at the intersection where the extension supports meet. The standoff is removably secured to both the hole in the circuit board and the connection hole formed at the intersection of the extension supports. The standoff has a height that separates the circuit board from the inner and outer channels, the separating wall and the extension supports. To connect an optical fiber, the fiber is routed around the outer channel, crossed from the outer channel to the inner channel at an opening in the separating wall and routed around the inner channel.

23 Claims, 4 Drawing Sheets

OPTICAL FIBER ROUTING DEVICE AND METHOD OF ASSEMBLY THEREFOR

BACKGROUND OF THE INVENTION

1. Field of the Invention

The present invention relates in general to an optical fiber routing device and more particularly to a device for routing optical fibers for interconnection with a printed circuit board.

2. Description of the Related Art

The use of optical fibers to transmit high speed data signals is becoming more and more common. Glass fibers are used to route transmit signals long distances, perhaps between countries. Polymeric fibers are used for much shorter distances, where signal attenuation is not a problem. For example, in a telephone switching office, the various switching components are split onto different printed circuit boards. Polymeric optical fibers may be used to route the signals between the different circuit boards.

FIG. 1 is a perspective view of a conventional printed circuit board 8 and the apparatus for interconnecting an optical fiber therewith. Printed circuit board 8 is generally placed in a shelf or rack alongside other such circuit boards. Electrical contacts 12 connect with corresponding contacts at the back of the shelf. Circuit board 8 is secured into place with a pair of locking devices 14.

In FIG. 1, optical fibers are first received by reception ports 2. Then, optical fiber pieces 4 are used for transferring signals between reception ports 2 and electro-optical converters 6. The optical fiber pieces 4 generally come in three and six foot lengths with connectors 5 provided at the ends thereof. However, printed circuit board 8 may have a width of only several inches. To accommodate for the extra length in the optical fiber pieces 4, they are channelled around the circuit board 8 as shown in FIG. 1. Clips 10 are used to secure the optical fiber pieces 4 to the printed circuit board 8.

With increasing desire for greater integration, the space on circuit board 8 has become expensive. To secure the clips 10 to circuit board 8, holes, perhaps four or more holes, must be drilled through the circuit board 8. With four holes each having a three eights inch diameter, this consumes about 0.44 square inches of space. The components on the circuit board are connected together with traces above and within the board. The length of a trace may be limited by signal degradation or loss of speed problems associated with longer lengths. Wherever a hole appears in the circuit board for a clip 10, a trace cannot be placed. If the trace has a limited length, placement of the components connected by the trace can be complicated. Furthermore, with the configuration shown in FIG. 1, the optical fiber pieces 4 run immediately adjacent to the printed circuit board 8. Only small components can fit under optical fiber 4. Large components would disturb the routing. That is, the optical fiber 4 has a minimum bend radius, and if bent beyond the minimum bend radius, signal degradation will result. Nine linear inches (the circumference of the circle of fiber) of fiber may be required to loop the fiber around to take up slack without bending beyond the minimum bend radius. Over this distance, the height of components is limited.

Designing where to place clips 10 also poses a problem. If it is necessary to move one clip 10 because of a trace intersection, for example, all other clips 10 must be also moved. To simultaneously find four acceptable places for all clips 10 represents a problem.

Once the printed circuit board 8 is designed with the layout of the components and the holes for clips 10, assembly can be difficult. To assemble the device, the fiber optic pieces 4 are generally routed, by hand, through the clips 10. As mentioned above, the optical fiber pieces cannot be bent beyond the minimum bend radius. Whether this requirement is satisfied depends on the individual operator doing the assembly.

As an alternative to the configuration shown in FIG. 1, it has been proposed to mount clips 10 to a unit which in turn is mounted to the printed circuit board 8. The purpose of this device is to minimize the number of holes that must be formed through printed circuit board 8. However, this device also increases the height above the printed circuit board 8 at which the optical fiber pieces 4 are routed. In FIG. 1, reference numerals 11 represents standoffs. A smaller circuit board is mounted to the standoffs 11. If a separate device is used for mounting clips 10, the height of the routing extends beyond the bottom of standoffs 11 and interferes with connection of the smaller circuit board.

SUMMARY OF THE INVENTION

Accordingly, it is an object of the present invention to minimize the area on the printed circuit board consumed by holes for routing optical fibers.

It is a further object of the present invention to avoid component height restrictions where optical fibers are to be routed.

It is another object of the present invention to ease the layout design of a printed circuit board.

It is yet another object of the present invention to ensure that optical fibers are routed without bending beyond the minimum bend radius thereof.

It is still a further object of the present invention to provide a device that allows optical fibers to be routed and does not interfere with mounting a smaller circuit board above a main circuit board.

These and other objects are accomplished by providing an optical fiber routing unit which mounts to a circuit board with a hole formed therein. This routing unit has an oval shaped inner and outer channels separated by an oval shaped separating wall, extension supports and a standoff. The oval shaped inner channel has a radius at least as large as a minimum bend radius of a polymeric optical fiber. The oval shaped outer channel follows the inner channel, but has a larger radius than the inner channel. The oval shaped separating wall has a plurality of openings formed therein where passage between the inner and outer channels is possible. The extension supports extend between the opposing sides of the inner channel. The extension supports meet at an intersection thereof, and a connection hole is formed at the intersection where the extension supports meet. The standoff is removably secured to both the hole in the circuit board and the connection hole formed at the intersection of the extension supports. The standoff has a height that separates the circuit board from the inner and outer channels, the separating wall and the extension supports. To connect an optical fiber, the fiber is routed around the outer channel, crossed from the outer channel to the inner channel at an opening in the separating wall and routed around the inner channel.

BRIEF DESCRIPTION OF THE DRAWINGS

The invention will be readily understood by reference to the following description of specific embodiments described by way of example only, with reference to the accompanying drawings, wherein.

DETAILED DESCRIPTION OF THE PREFERRED EMBODIMENTS

Figure 2:
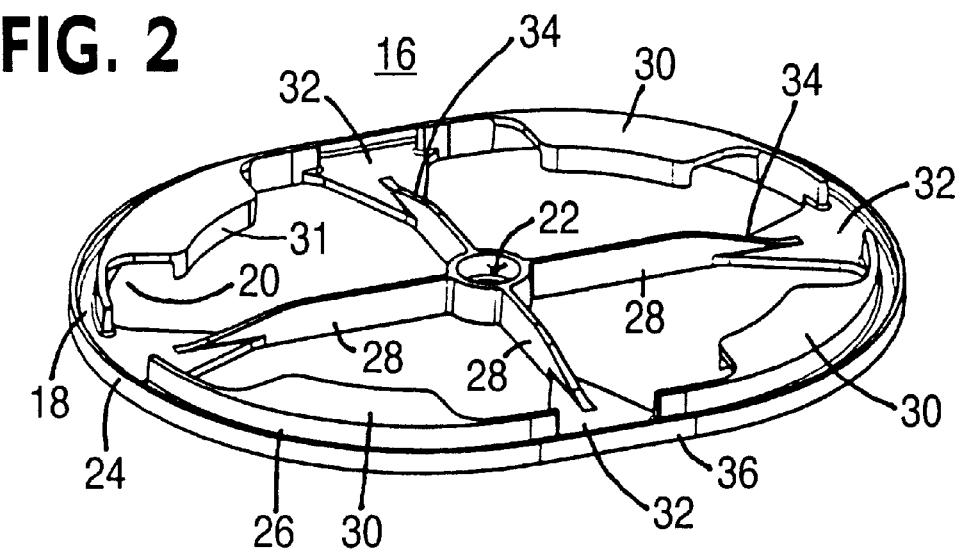
FIG. 2 is a top perspective view of an optical fiber routing ring according to the present invention.
Figure 3:
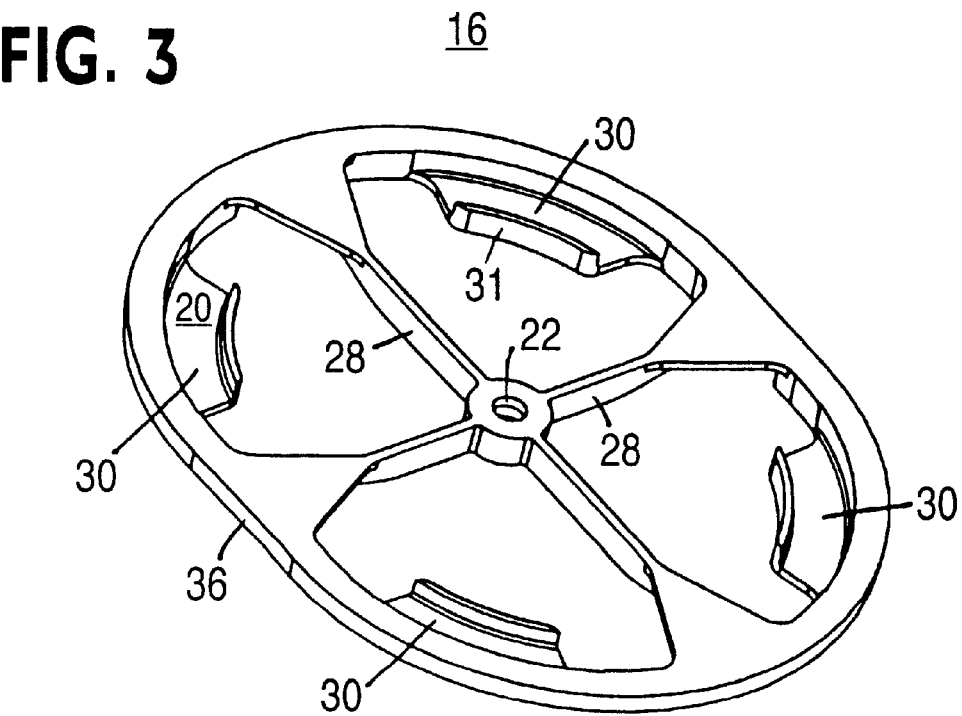
FIG. 3 is a bottom perspective view of the optical fiber routing ring shown in FIG. 2.
Figure 4:
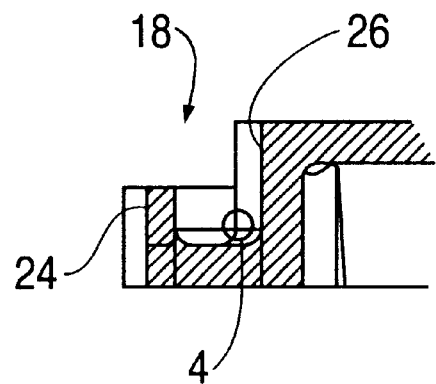
FIG. 4 is an enlarged side view of the outer channel as shown in FIG. 2.

FIG. 2 is a top perspective view of an optical fiber routing ring according to the present invention, and FIG. 3 is a bottom perspective view of the optical fiber routing ring shown in FIG. 2. The optical fiber ring 16 has an outer channel 18 and an inner channel 20. A center hole 22 is provided to secure the optical fiber ring 16 to a printed circuit board. The outer channel 18 is formed from a continuous outer wall 24 and a separating wall 26. FIG. 4 is an enlarged side view of the outer channel shown in FIG. 2. As can be seen in FIG. 4, the continuous outer wall 24 is high enough to retain optical fiber 4 but low enough to allow optical fiber 4 to easily enter/exit from the outer channel 18.

As can be seen in FIG. 2, the separating wall has openings in the middle and at the ends of the optical fiber ring 16. Where the separating wall 26 is discontinuous, the fiber can pass from the outer channel 18 to the inner channel 20.

The center support is comprised of extension supports (posts 28) extending between opposite sides of the optical fiber ring 16. Hole 22 is formed where the extension supports intersect. As can best be seen in FIG. 3, a flanged lip 30 is provided between adjacent posts. The inner channel is defined on the outside by the separating wall 26 (see FIG. 4), on the bottom by flat portions 32 of posts 28 on the inside by elevated walls 34 of posts 28 and by lips 31 of flange lips 30 and on the top by flat portions of flanged lips 30.

Figure 5:
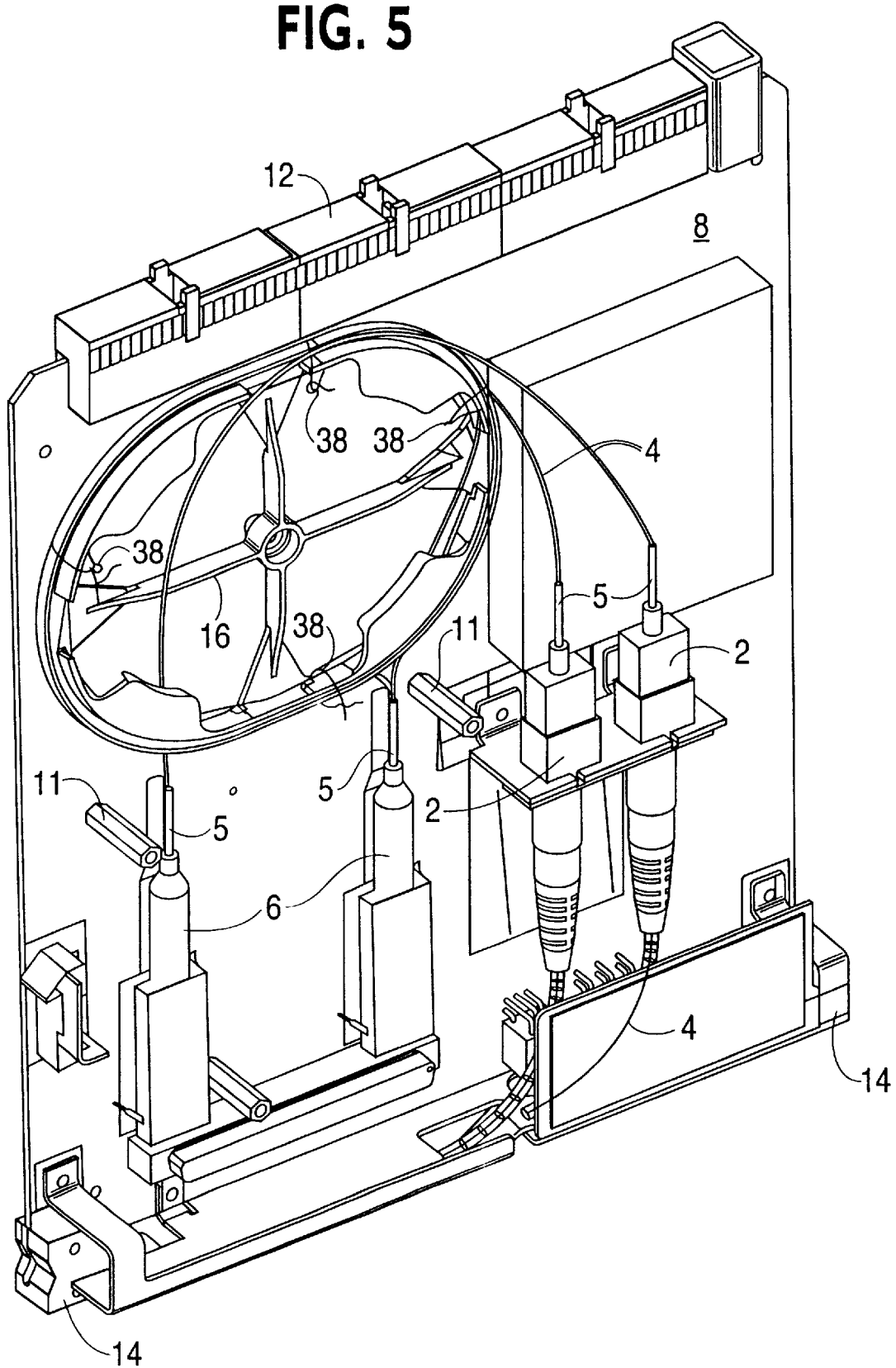
FIG. 5 is a perspective view of a printed circuit board with an optical fiber routing ring shown in FIG. 2 mounted thereon.

FIG. 5 is a perspective view of a printed circuit board 8 with the optical fiber routing ring 16 shown in FIG. 2 mounted thereon. In FIG. 5, like reference numerals are used to represent like elements, and a duplicate description thereof will be eliminated. Although FIG. 5 shows only one reception port 2 connected to an electro-optical converter 6 via optical fiber 4, in normal use, both would be connected.

Figure 1:
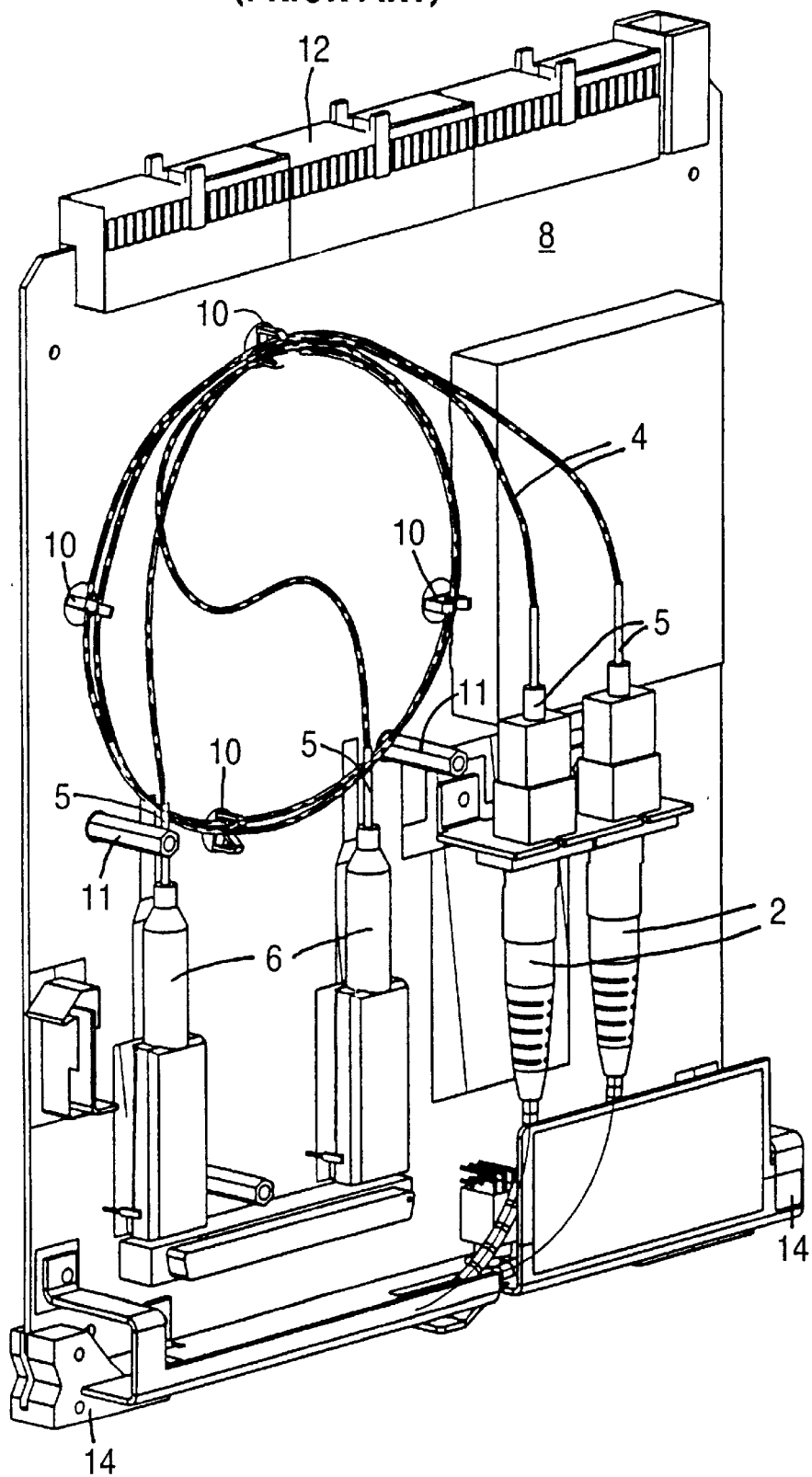
FIG. 1 is a perspective view of a conventional circuit board and the apparatus for connecting an optical fiber thereto.

To achieve the product shown in FIG. 5, the componentry of circuit board 8 must be designed and assembled. However, this represents a much simpler task than that for the device shown in FIG. 1. In designing the layout, the designer of the device shown in FIG. 5 must choose a place to mount the optical fiber routing ring 16. However, as will be described later, to mount the optical fiber ring 16 requires placement of only one hole in circuit board 8. The designer can pick any place for the hole (perhaps a ⅜ inch diameter hole) where a trace or component does not exist. The only constraint is that the optical fiber ring 16 cannot extend beyond the ends of the board 8. There is no longer the need to simultaneously find four or more agreeable places on the board that will together successfully route the fiber.

Figure 6:
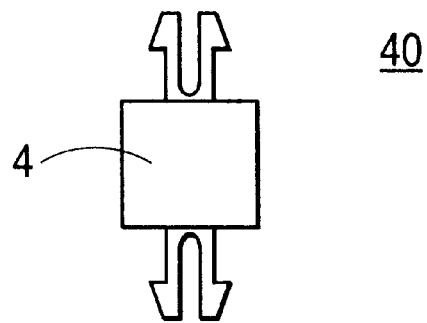
FIG. 6 is a side view of a standoff.

FIG. 6 is a side view of a standoff fastener 40 used to mount the optical fiber ring 16 to the circuit board 8. Standoff 40 has a widened middle portion 42 with expanding connecting legs 44 on opposing sides of the widened middle portion 42. Standoffs such as standoff 40 are available commercially from companies such as RICHCO. On pair of connecting legs 44 is inserted through a hole in the circuit board 8. The other pair of connecting legs 44 is inserted through the center hole 22 of the optical fiber ring 16. Connecting legs 44 expand to lock the optical fiber ring 16 in place. The widened middle portion has a height which lifts the optical fiber ring 16 away from the circuit board 8. Standoff fasteners 40 are available in different heights depending on the distance at which the optical fiber ring 16 should be positioned away from the circuit board 8. The only constraint on the height is that the optical fiber ring 16 cannot be positioned so far away from the circuit board 8 that the optical fiber ring 16 extends beyond a face plate (not shown) to interfere the positioning of an adjacent circuit board on the shelf or rack housing circuit board 8. Because the optical fiber ring 16 is positioned away from the circuit board 8, routing the optical fiber 4 may consume less space on circuit board 8. That is, with the configuration shown in FIG. 1, tall components can not be placed under the optical fiber 4, when routed. This is not a problem with the configuration shown in FIG. 5.

After the optical fiber ring 16 is attached to the circuit board 8, connecting the optical fiber 4 is a much simpler task than with the prior art. First, one end of an optical fiber piece 4 is connected via a fiber connector 5. For the device shown in FIG. 5, assume the optical fiber piece 4 is first connected to the electro-optical converter 6 shown to the left in FIG. 5. Then, the fiber is drawn against the outer channel 18 (see FIGS. 2 and 3). When the fiber approaches the first opening between the inner and outer channels, the fiber is routed to the inner channel 20. Referring to FIG. 5, the first opening would be that shown closest to the left side of the drawing. The fiber is wound around the inner channel, and flanged lips 30 support the fiber as it is wound. The inner channel 20 of the optical fiber ring 16 has a radius at least as large as the minimum bend radius of the fiber. For example, the optical fiber may have a minimum bend radius of 1¼ inches. In this case, the inner channel should have a radius at least as large as 1¼ inches. Of course, the inner channel may have a larger radius, perhaps 1½ inches. Accordingly, it is much more difficult for the person installing the optical fiber 4 to deviate from the minimum bend radius.

The optical fiber 4 is wound around the inner channel 20 until the other end of the optical fiber 4 approaches. At this point, the optical fiber 4 is withdrawn from the inner channel at an opening between the inner and outer channels. The end of the optical fiber 4 is drawn along the outer channel 18 until it reaches the reception port 2 at the opposite side. In our example, the reception port 2 shown to the left in FIG. 5 is connected.

To secure the optical fiber 4 to the optical fiber ring 16, twist tie wire fasteners 38 can be used, for example. There are eight places for wire fasteners 38, one on each side of the flat portion 32 of post 28.

As can be seen in FIGS. 2, 3 and 5, the optical fiber ring 16 is elongated, having an oblong shape. That is, at the sides of the optical fiber ring 16, there are straight edges 36. Of course, the sides of optical fiber ring 16 are not limited to straight edges 36. The sides may have a gradual slope where straight edge 36 is shown.

The purpose of the oblong or oval shape is to allow the optical fiber ring 16 to take up slack in optical fiber 4. If the optical fiber ring 16 were perfectly round, the optical fiber 4 would, at all times, be directly adjacent to the separating wall 26. That is, to maintain the minimum bend radius, the fiber could only be routed according to the circular shape. For example, assume the appropriate place (as far as proximity with reception port 2 is concerned) for the optical fiber 4 to exit a perfectly round ring is an opening toward the top of FIG. 5. In this case, if there was not enough fiber remaining to make an additional complete rotation about the perfectly round optical fiber ring, the fiber would be pulled out prematurely and connected to reception port 2. However, this may produce a substantial amount of extra optical fiber and there may be significant problems with routing this extra optical fiber. If the optical fiber ring 16 were perfectly round, the chance for operator error would be increased.

With the oblong shape of the present invention, however, the optical fiber ring can be shortened. Because the optical fiber ring 16 is not perfectly round, but is oblong, the operator is given much more freedom to route the fiber without deviating from the minimum bend radius. For example, assume that the optical fiber 4 had made four rotations about the inner channel 20, and there is not enough optical fiber 4 remaining to make a fifth rotation. However, there may be too much optical fiber 4 to directly connect to the reception port 2. In this case, the operator could loosen wire fastener 38 shown at the left of FIG. 5 and route five complete rotations. Some or all of the rotations could be routed in a more circular, less oblong configuration. This would provide the extra length of fiber necessary to complete the fifth rotation. With the oblong shape, it is much easier for an operator to fit optical fiber 4 onto the circuit board 8 without leaving excess optical fiber and without deviating from the minimum bend radius.

While the invention has been described in connection with the preferred embodiments, it will be understood that modifications within the principles outlined above will be evident to those skilled in the art. Thus, the invention is not limited to the preferred embodiments, but is intended to encompass such modifications.

What is claimed is:

1. An optical fiber routing device, comprising:
   an oval shaped inner channel having opposing sides and a radius at least as large as a minimum bend radius of a polymeric optical fiber;
   an oval shaped outer channel following the inner channel, but having a larger radius than the inner channel;
   an oval shaped separating wall separating the inner and outer channels, the oval shaped separating wall having a plurality of openings formed therein where passage between the inner and outer channels is possible; and
   extension supports extending between the opposing sides of the inner channel, the extension supports meeting at an intersection, a connection unit being formed at the intersection of the extension supports.

2. An optical fiber routing device according to claim 1, wherein the inner channel surrounds an interior and has a side defined by the separating wall, the device further comprising a plurality of overhangs formed from the separating wall to extend into the interior, the overhangs forming a bottom to the inner channel.

3. An optical fiber routing device according to claim 2, wherein each the overhang has a lip substantially parallel with the separating wall on which the overhang is formed.

4. An optical fiber routing device according to claim 1, wherein the extension supports have a thickness reduced in the vicinity of the inner channel.

5. An optical fiber routing device according to claim 4, wherein the thickness of the extension supports increases with increasing distance away from the inner channel.

6. An optical fiber routing device according to claim 4, wherein
   the extension supports meet at an intersection thereof, and
   a connection hole is formed at the intersection of the extension supports.

7. An optical fiber routing device according to claim 1, wherein there are at least four openings in the separating wall, provided respectively at opposing sides and opposing ends of the oval shaped separating wall.

8. An optical fiber routing device according to claim 1, wherein the inner and outer channels are continuous.

9. An optical fiber routing device according to claim 1, wherein the inner and outer channels and the separating wall are formed as a one-piece plastic unit.

10. An optical fiber routing device according to claim 1, wherein the oval shaped inner channel has a radius of at least 1¼ inches.

11. An optical fiber routing device, comprising:
    an oval shaped inner channel having opposing sides and a radius at least as large as a minimum bend radius of a polymeric optical fiber;
    an oval shaped outer channel following the inner channel, but having a larger radius than the inner channel; and
    an oval shaped separating wall separating the inner and outer channels, the oval shaped separating wall having a plurality of openings formed therein where passage between the inner and outer channels is possible;
    extension supports extending between opposing sides of the inner channel, the extension supports having a thickness reduced in the vicinity of the inner channel; and
    a plurality of overhangs formed between intersections of the extension supports and the inner channel, the extension supports having a thickness reduced to serve as one of a top or a bottom to the inner channel, such that the overhangs serve as the other of the top or bottom to the inner channel.

12. An optical fiber connection unit, comprising:
    a circuit board having a hole formed therein;
    an oval shaped inner channel having opposing sides, opposing ends and a radius at least as large as a minimum bend radius of a polymeric optical fiber;
    an oval shaped outer channel following the inner channel, but having a larger radius than the inner channel;
    an oval shaped separating wall separating the inner and outer channels, the oval shaped separating wall having a plurality of openings formed therein where passage between the inner and outer channels is possible;
    extension supports extending between the opposing sides of the inner channel, the extension supports meeting at an intersection, a connection hole being formed at the intersection of the extension supports; and
    a standoff removably secured to both the hole in the circuit board and the connection hole formed at the intersection of the extension supports meet.

13. An optical fiber connection unit according to claim 12, wherein the standoff has a height that separates circuit board from the inner and outer channels, the separating wall and the extension supports.

14. An optical fiber connection unit according to claim 12, further comprising a plurality of overhangs formed between intersections of the extension supports and the inner channel, the extension supports having a thickness reduced to serve as one of a top or a bottom to the inner channel, such that the overhangs serve as the other of the top or bottom to the inner channel.

15. An optical fiber connection unit according to claim 12, wherein the thickness of the extension supports increases with increasing distance away from the inner channel.

16. An optical fiber connection unit according to claim 12, wherein there are at least four openings in the separating wall, provided respectively at opposing sides and opposing ends of the oval shaped separating wall.

17. An optical fiber connection unit according to claim 12, wherein the inner and outer channels are continuous.

18. An optical fiber connection unit according to claim 12, wherein the inner and outer channels and the separating wall are formed as a one-piece plastic unit.

19. An optical fiber connection unit according to claim 12, wherein the oval shaped inner channel has a radius of at least 1¼ inches.

20. A method of assembling an optical fiber piece to a circuit board, comprising the steps of:
   inserting a standoff through a hole in a circuit board;
   placing the standoff through a hole in an optical fiber routing device;
   connecting a first end of an optical fiber to a first connector;
   routing the optical fiber around an oval shaped outer channel of the optical fiber routing device;
   crossing from the outer channel through one of a plurality of openings formed in an oval shaped separating wall of the optical fiber routing device;
   routing the optical fiber around an oval shaped inner channel of the optical fiber routing device, the inner channel following the outer channel, but having a radius smaller than the inner channel, the radius of the inner channel being at least as large as a minimum bend radius of the optical fiber; and
   connecting a second end of the optical fiber to a second connector.

21. A method of assembling an optical fiber piece to a circuit board according to claim 20, further comprising the step of selecting the standoff from a plurality of standoffs having different heights.

22. A method of assembling an optical fiber piece to a circuit board according to claim 20, further comprising the step of fastening the optical fiber to the inner channel.

23. A method of assembling an optical fiber piece to a circuit board according to claim 20, wherein the optical fiber traverses around the inner channel with a plurality of loops, the method further comprising the step of fastening all of the loops at one opposing end of the inner channel while only fastening a portion of the loops at the other opposing end.

* * * * *